(12) United States Patent
Kubo et al.

(10) Patent No.: US 9,855,612 B2
(45) Date of Patent: Jan. 2, 2018

(54) METHOD OF MANUFACTURING STYLUS AND STYLUS

(71) Applicant: Panasonic Intellectual Property Management Co., Ltd., Osaka (JP)

(72) Inventors: Masahiro Kubo, Osaka (JP); Toshihiko Wada, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 133 days.

(21) Appl. No.: 15/099,593

(22) Filed: Apr. 15, 2016

(65) Prior Publication Data

US 2016/0349035 A1 Dec. 1, 2016

(30) Foreign Application Priority Data

Jun. 1, 2015 (JP) .................. 2015-111278

(51) Int. Cl.
| | | |
|---|---|---|
| *G01B 5/012* | (2006.01) | |
| *B23C 3/32* | (2006.01) | |
| *B23G 1/36* | (2006.01) | |
| *B24B 19/02* | (2006.01) | |
| *B24B 5/04* | (2006.01) | |
| *B24B 5/16* | (2006.01) | |

(52) U.S. Cl.
CPC .............. *B23C 3/32* (2013.01); *B23G 1/36* (2013.01); *B24B 5/04* (2013.01); *B24B 5/16* (2013.01); *B24B 19/022* (2013.01); *G01B 5/012* (2013.01)

(58) Field of Classification Search
CPC .... B23C 3/32; B24G 5/04; B24G 5/16; B24G 19/022

USPC ................. 33/542, 546, 550, 551, 559
See application file for complete search history.

(56) References Cited

U.S. PATENT DOCUMENTS

| | | | | |
|---|---|---|---|---|
| 5,491,904 A | * | 2/1996 | McMurtry | G01B 5/012 33/558 |
| 5,659,969 A | * | 8/1997 | Butler | G01B 11/007 33/556 |
| 6,370,788 B1 | * | 4/2002 | Hellier | G01B 5/012 33/556 |
| 7,770,302 B2 | * | 8/2010 | Tanaka | G01B 7/016 33/559 |
| 2007/0276534 A1 | * | 11/2007 | Takahashi | B23Q 1/34 700/193 |
| 2008/0282839 A1 | | 11/2008 | Suzuki et al. | |
| 2010/0280650 A1 | * | 11/2010 | Takami | B24B 13/06 700/186 |
| 2010/0299946 A1 | * | 12/2010 | Kawabata | G01B 5/012 33/556 |
| 2011/0232118 A1 | * | 9/2011 | Hon | G01B 3/008 33/559 |
| 2012/0248960 A1 | | 10/2012 | Shirasu et al. | |

(Continued)

FOREIGN PATENT DOCUMENTS

| | | |
|---|---|---|
| JP | 59-135910 U | 9/1984 |
| JP | 5567622 B | 8/2014 |

*Primary Examiner* — G. Bradley Bennett
(74) *Attorney, Agent, or Firm* — Panasonic IP Management; Kerry S. Culpepper

(57) ABSTRACT

Processing is performed from the front end of a bulb to a connection portion with a shaft along an inclined surface of the bulb, using a rotary tool that is inclined at an angle formed by a connection point of a radius of the shaft with a radius of the bulb and the front end of the bulb; then, processing of the shaft is performed, and a stylus is manufactured.

8 Claims, 6 Drawing Sheets

(56) References Cited

U.S. PATENT DOCUMENTS

2016/0084631 A1* 3/2016 Nakayama ............. G01B 5/201
                                                        33/550
2016/0161239 A1* 6/2016 Takanashi ............. G01B 5/201
                                                        33/551

* cited by examiner

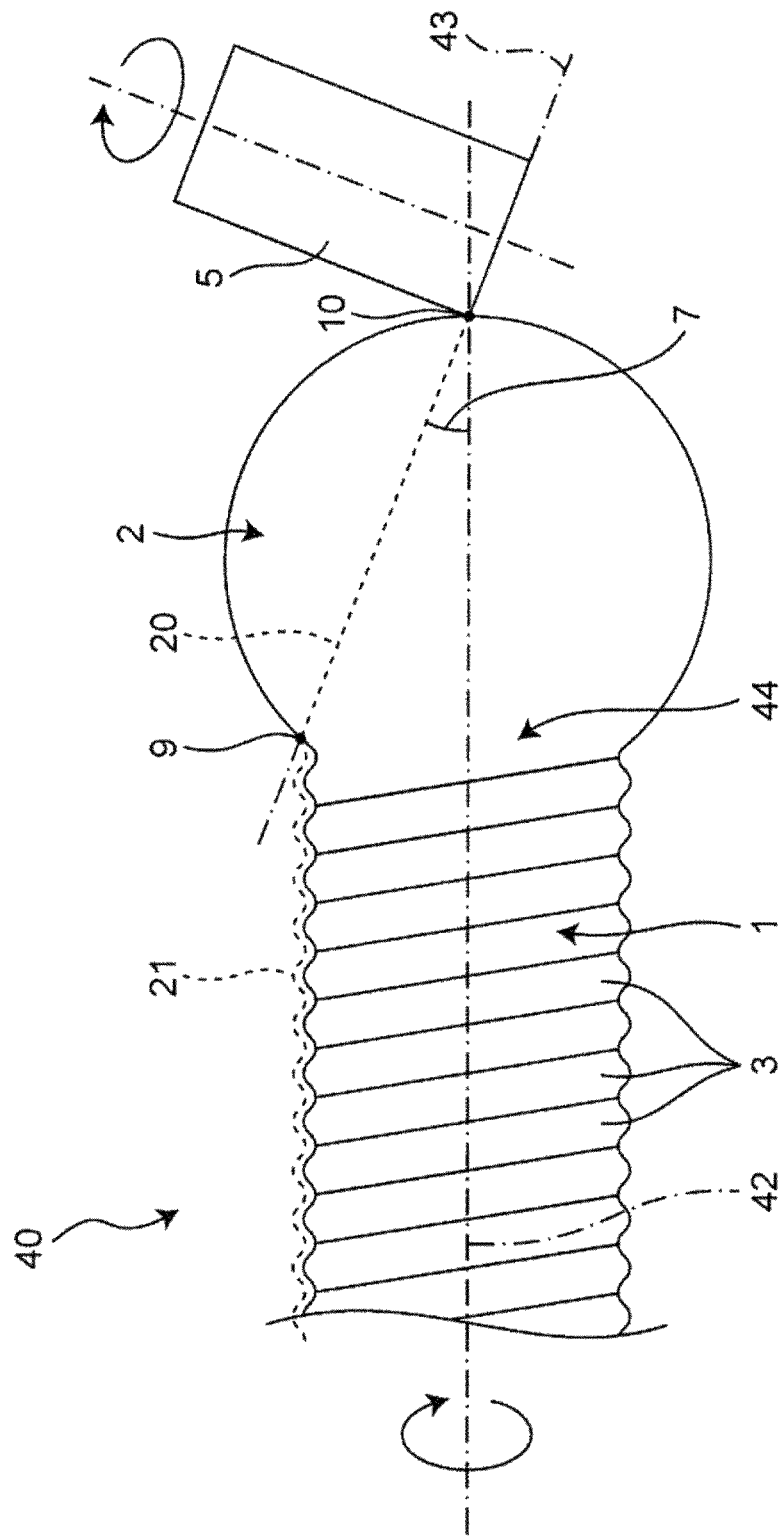

METHOD OF MANUFACTURING STYLUS AND STYLUS

TECHNICAL FIELD

The technical field relates to a method of manufacturing a stylus in which the stylus has a shaft and a bulb having a diameter greater than a diameter of the shaft.

BACKGROUND

In the related art, as a stylus including a bulb on the front end of a shaft, which has a diameter greater than a diameter of a shaft, a stylus disclosed in Japanese Patent No. 5567622 has been known. In the example of the related art, the stylus is formed by polishing and grinding in a state in which polycrystalline diamond is fixed to the front end of a shaft by brazing.

Here, the example, of the related art is described in detail with reference to FIG. 5. The stylus includes bulb 102 on the front end of shaft 101, which has a diameter greater than a diameter of shaft 101. In a configuration thereof, stainless steel is used for shaft 101 and polycrystalline diamond is used for bulb 102. In terms of processing of bulb 102, after a polygonal chip is fixed to shaft 101 by brazing with brazing filler material 31, polishing is performed and the front end portion is processed to have a bulb shape. Then, the processed portion and shaft 101 are again brazed with brazing filler material 31, polishing processing of the front end portion is repeatedly performed, and thereby, bulb 102 is formed on the front end of shaft 101. Further, shaft 101 has mortar shape 32 in order to fit to bulb 102 and is accurately positioned with respect to bulb 102. The example of the related art is described in more detail in Japanese Patent No. 5567622.

SUMMARY

In the example of the related art described above, the bulb is good in wear resistance because polycrystalline diamond is used for the bulb; however, the bulb is connected to the shaft by brazing, bonding, or the like. Therefore, in a case where the stylus includes the bulb-having a small diameter, in order to measure an inner surface shape of a fine hole, the shaft and the bulb are configured of different members, the diameter of the bulb is decreased, and the diameter of the shaft becomes thin. As a result, when sufficient fit-joining is not performed, there are problems in that the central axes thereof are likely to deviate from each other, the shaft comes into contact with the inner surface of the fine hole, and thus, it is not possible to measure an exact shape. In addition, the diameter of the shaft becomes thin and, thereby, a problem arises in that sufficient connection strength is not obtained between the bulb and the shaft by the brazing or the like.

In consideration of the problems of the example in the related art, invention concern of the present disclosure is to provide a method of manufacturing the stylus in which it is possible to measure an inner surface shape of a fine hole with high accuracy.

A stylus according to an aspect includes a bulb on the front end of a shaft, which has a diameter greater than a diameter of the shaft, in which the shaft and the bulb are formed of one member and the outer circumferential surface of the shaft has a corrugated section.

A method of manufacturing a stylus according to another aspect includes: processing from the front end of a bulb to a connection portion with a shaft along an inclined surface of the bulb, using a rotary tool that is inclined at an angle formed by a connection point of a radius of the shaft with a radius of the bulb and the front end of the bulb; and, processing the shaft.

As above, according to the method of manufacturing the stylus and the stylus according to an aspect, in a case where an inner surface shape of a fine hole is measured, it is possible to measure the inner surface shape of the fine hole with accuracy without the shaft coming into contact with an inner surface of the fine hole, and it is possible to realize a stylus having a longer service life.

BRIEF DESCRIPTION OF THE DRAWINGS

FIG. 3A is a side view illustrating the arrangement, of a rotary tool and the stylus used according to the embodiment.

DETAILED DESCRIPTION OF PREFERRED EMBODIMENTS

Embodiment

Hereinafter, an exemplary embodiment will be described with reference to FIGS. 1 to 3B.

Figure 1:
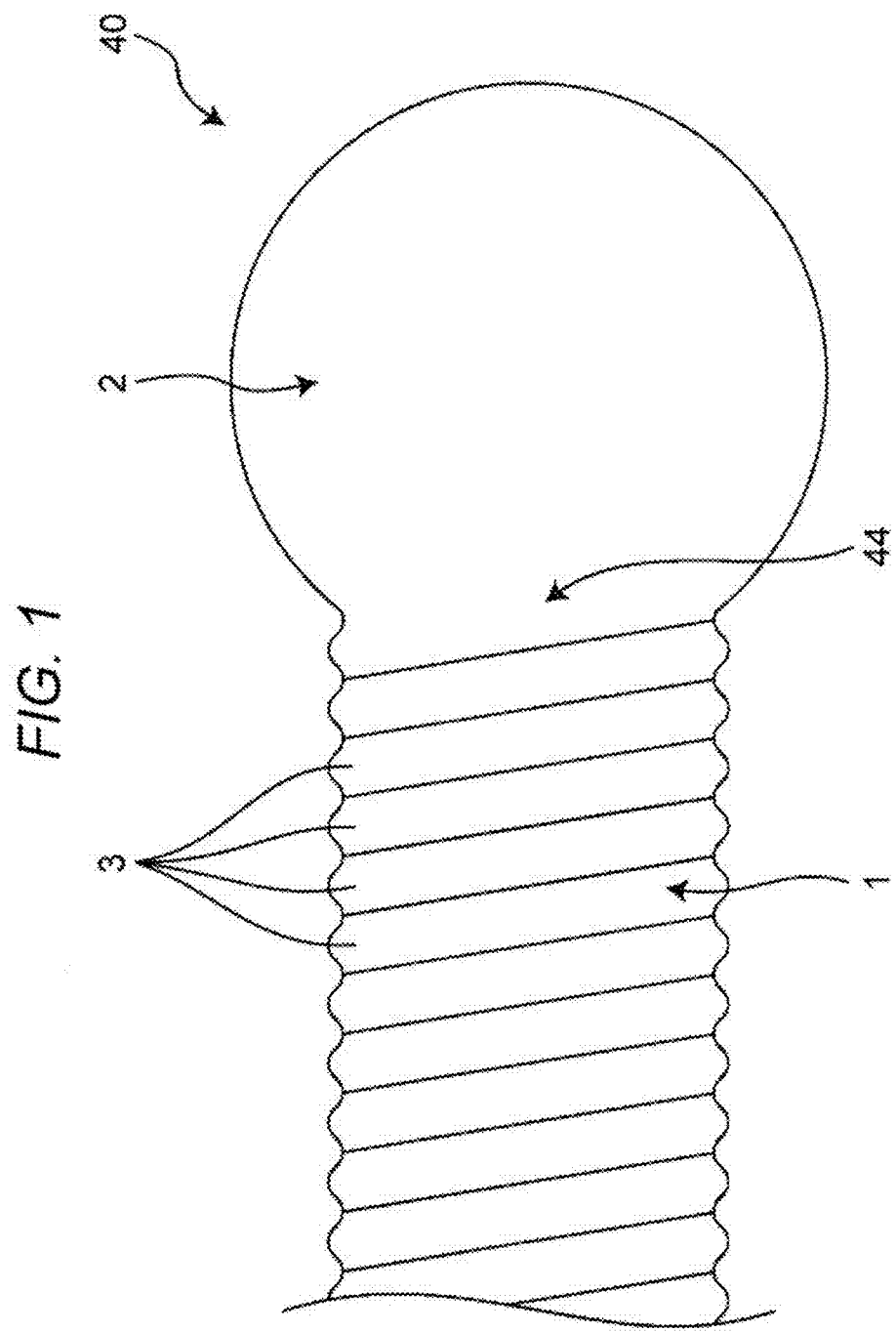
FIG. 1 is a view illustrating a shape of a stylus that is manufactured according to an embodiment.

FIG. 1 illustrates a shape of stylus 40 that is manufactured according to an exemplary embodiment. Stylus 40 is configured to include shaft 1 and bulb 2. Bulb 2 and shaft 1 are integrally formed and the bulb 2 is positioned on the front end of the shaft 1 and is formed to have a diameter greater than a diameter of shaft 1.

Spiral-shaped groove 3 is formed on at least the outer circumferential surface of shaft 1 in the vicinity of bulb 2.

The rear end portion of stylus 40 (not illustrated) is formed to have a tapered shape at an angle of 30 degrees.

Figure 2:
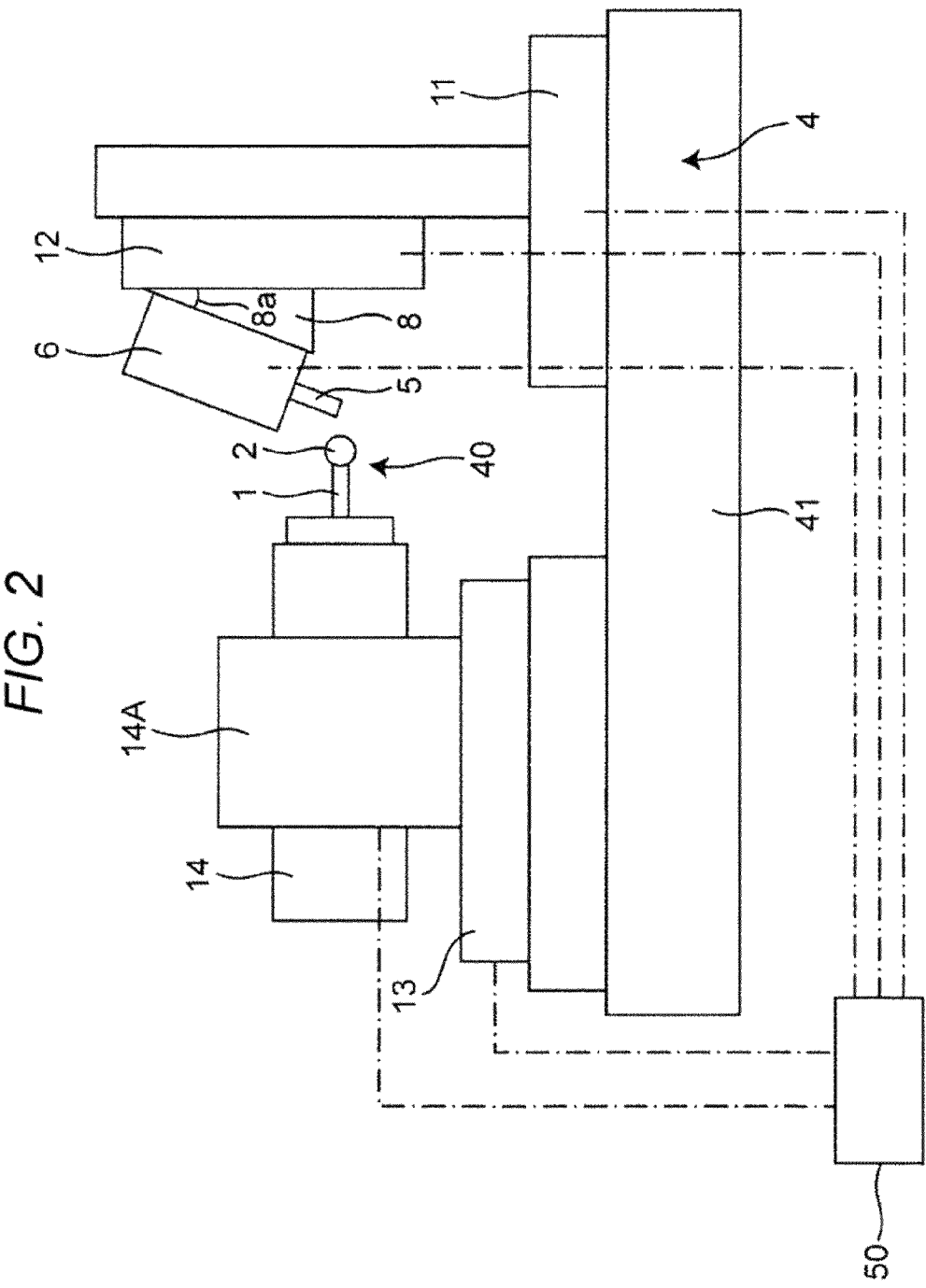
FIG. 2 is a side view illustrating an arrangement of a processing apparatus and the stylus used according to the embodiment.

As illustrated in FIG. 2, processing apparatus 4 for manufacturing stylus 40 of the embodiment is configured to include tool spindle tool spindle attaching section 8, Y-direction driving stage 12, X-direction driving stage 11, Z-direction driving stage 13, and controller 50.

Tool spindle 6 holds and rotates rotary tool 5 included In processing apparatus 4.

Tool spindle attaching section 8 is disposed on Y-direction driving stage 12 of processing apparatus 4 and allows tool spindle 6 to be attached at an arbitrary angle.

X-direction driving stage 11 and z-direction driving stage 13 are disposed at an interval over surface plate 41.

Y-direction driving stage 12 is disposed above X-direction driving stage 11.

Rotating apparatus 14A that rotates rotary shaft 14 is mounted on z-direction driving stage 13 at a position facing Y-direction driving stage 12. Rotary shaft 14 is supported in rotating apparatus 14A so as to be rotatable along an XY plane in a horizontal direction. Rotary tool 5 is disposed to intersect with rotary shaft 14 at a predetermined angle.

Controller 50 controls a manufacturing operation of processing apparatus 4, is connected to tool spindle 6, Y-direction driving stage 12, X-direction driving stage 11, z-direction driving stage 13, and rotating apparatus 14A, and performs individual control of operations, respectively.

Figure 3B:
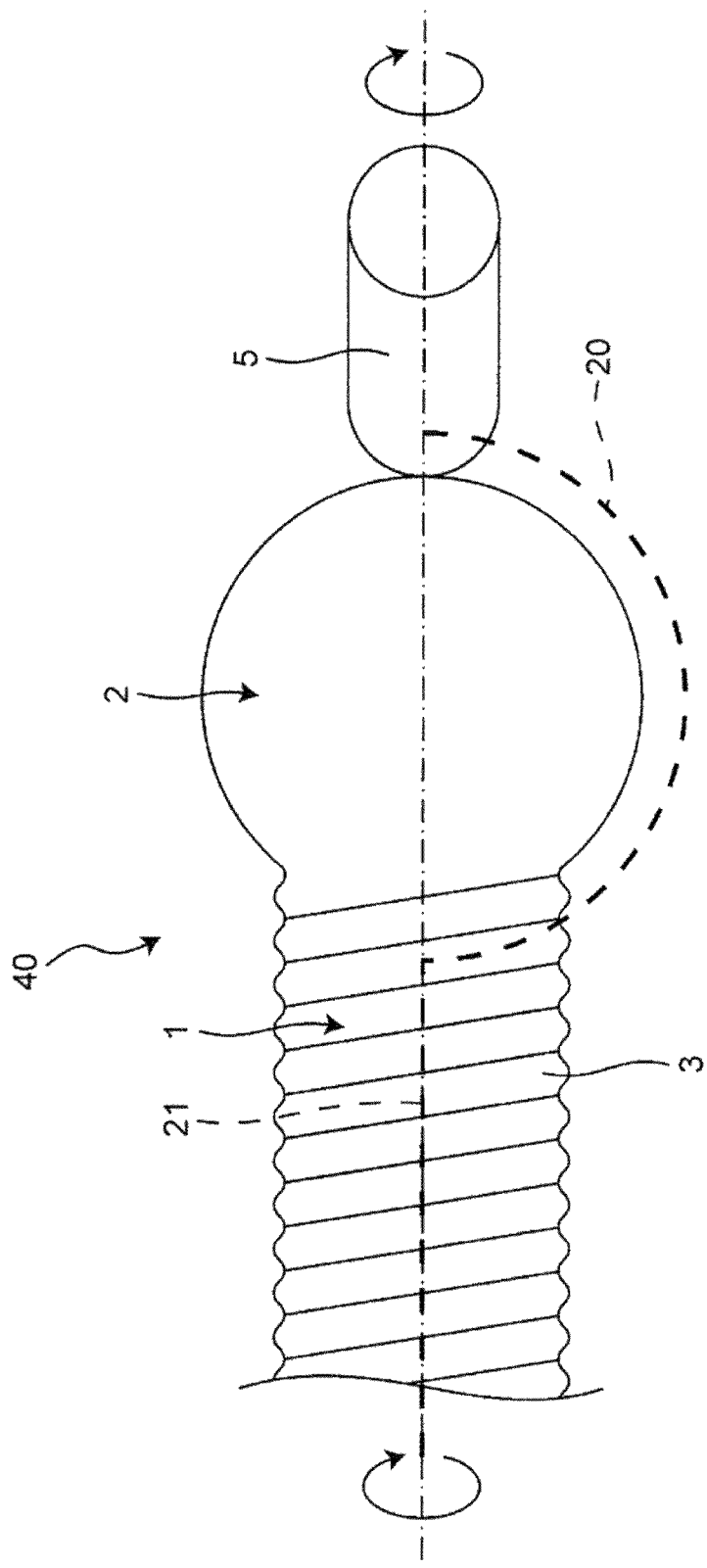
FIG. 3B is a top view illustrating the arrangement of the rotary tool and the stylus used according to the embodiment.

FIG. 3A is a side view illustrating a positional relationship between rotary tool 5 and stylus 40 according to the embodiment. In FIG. 3A, processing track 20 represents a position of movement of rotary tool 5 on bulb 2, and wavy processing track 21 represents a position of movement of rotary tool 5 on shaft 1. In addition, angle 7 represents an angle formed by straight line 43 and rotational axis 42 of shaft 1 when straight line 43 is considered to connect connection point 9 of a radius of shaft 1 with a radius of bulb 2, to connection point 0 of rotational axis 42 of shaft 1 with the front end of bulb 2. Angle 7 is equal to inclination angle 8a of tool spindle attaching section 8 in FIG. 2. FIG. 3B is a top view illustrating a positional relationship between rotary tool 5 and stylus 40 according to the embodiment.

In the present embodiment, as illustrated in FIG. 1 and FIGS. 3A and 3B, stylus 40 to be manufactured has a shape including shaft 1 and bulb 2 on the front end of shaft 1, which has a diameter greater than a diameter of shaft 1. Connection portion 44 of shaft 1 with bulb 2 is connected to a radius of an arc of the front end portion of rotary tool 5. Groove 3 which is spirally continuous is formed on the outer circumferential surface of shaft 1. Groove 3 functions as an example of a corrugated section. The corrugated section causes a surface area of shaft 1 to be increased and improves heat exhausting effect, compared to a case where no corrugated section is formed. In addition, as an example, bulb 2 has a radius of 0.03 mm and shaft 1 has a radius of 0.02 mm and a length of 0.5 mm. In terms of a width or pitch, a depth, or the like, of groove 3 as an example, the pitch is 0.02 mm and the depth, is 0.2 µm.

As an example, polycrystalline diamond formed to have a columnar shape is used for rotary tool 5 according to the present embodiment and. the polycrystalline diamond has a particle size of 2 µm. In addition, as an example, as a material of stylus 40 that is manufactured in the present embodiment, ultra-fine cemented carbide having a particle size of 0.2 µm or less is used.

In FIGS. 1 to 3B, a method of manufacturing stylus 40 is described in detail. Respective processes of the manufacturing method can be achieved by driving the respective apparatuses and members under control of controller 50.

In FIG. 2, as an example, in a state in which rotary tool 5 is attached to tool spindle 6, rotary tool 5 is caused to rotate at a speed of 70,000 rpm. At this time, tool spindle 6 is attached to processing apparatus 4 by tool spindle attaching section 8, at angle 7 (refer to FIG. 3A) from the diameter of shaft 1 and the front end portion of bulb 2. Stylus 40 is attached to rotary shaft 14 and, as an example, in a state in which the central axis of rotary shaft 14 and the central axis of shaft 1 are coincident within an error range of 0.2 µm or less (state of being substantially coincident), rotation apparatus 14A rotates stylus 40 along with the rotary shaft 14 at a speed of 60 rpm. As an example, in advance, stylus 40, which was processed using a circular material having a diameter of Φ1.0 mm to have a conic shape continuous at an angle of 30 degrees from the diameter of Φ1.0 mm to the front and a columnar shape having a diameter of φ0.1 mm and a length of 0.6 mm, was used.

Subsequently, using the columnar-shaped material having the diameter of Φ1.0 mm, crude processing was performed to form the
columnar shape having a diameter of Φ0.1 mm and a length of 0.6 mm on the front end of the conic shape formed at the angle of 30 degrees from the diameter of φ1.0 mm and a material for stylus 40 which is applied to the present manufacturing method was prepared. A relative front end portion height of rotary tool 5 with respect to rotary shaft 14 and a central axis height of rotary shaft 14 are matched in advance such that a shape which is a so-called central protrusion is not formed on the front end of bulb 2 due to mismatch, between the relative front end portion height of rotary tool 5 with respect to rotary shaft 14 and the central axis height of rotary shaft 14 when processing is performed.

First, as a first processing process, as an example, after Y-direction driving stage 12 of processing apparatus 4 is caused to move upward by a distance of a thickness of 0.1 mm of the front end portion of stylus 40, from the center of rotary shaft 14, X-direction driving stage 11, Y-direction driving stage 12, and Z-direction driving stage 13 of processing apparatus 4 are driven under control of controller 50, rotary tool 5 performs relative movement shown by processing track 20 in FIG. 3A, with respect to bulb 2 from the front end of bulb 2, and a bulb shape of bulb 2 is formed.

Then, the movement shown by processing track 21 in FIG. 3A is performed on the upper section, of shaft 1 from connection portion 44 of shaft 1 with bulb 2 to the rear end portion of shaft 1, spiral-shaped groove 3 is processed on shaft 1, and shaft 1 is formed. Here, rotary tool 5 moves with respect to bulb 2, on the inclined surface of bulb 2 at an angle of 7 degrees from the diameter of shaft 1 and the front end of bulb 2, and a connection arc in FIG. 3A of connection, portion 44 of bulb 2 with shaft 1 is processed by a radius of the front end portion of rotary tool 5 and is connected to a radius of the arc of the front end portion of rotary tool 5.

Next, as an example, as a second processing process, Y-direction driving stage 12 of processing apparatus A is caused to move downward by 0.001 mm of stylus 40, from rotary shaft 14, the first processing process is repeatedly performed, and processing of stylus 40 is performed to a height which is matched with the height, of the front end portion of rotary tool 5 and the central axis of rotary shaft 14.

Figure 4:
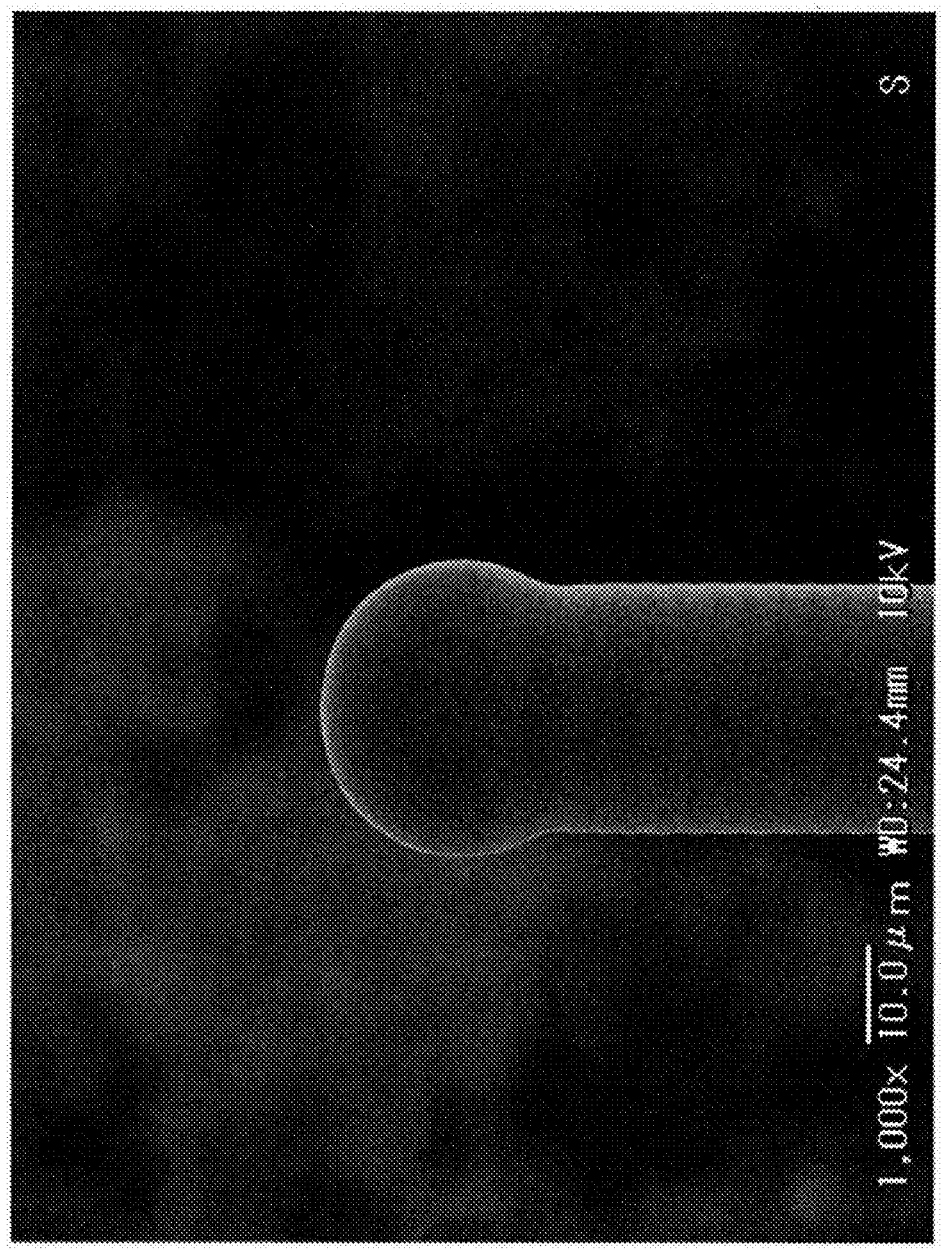
FIG. 4 is an SEM observation photograph of the stylus that is manufactured by the embodiment.
Figure 5:
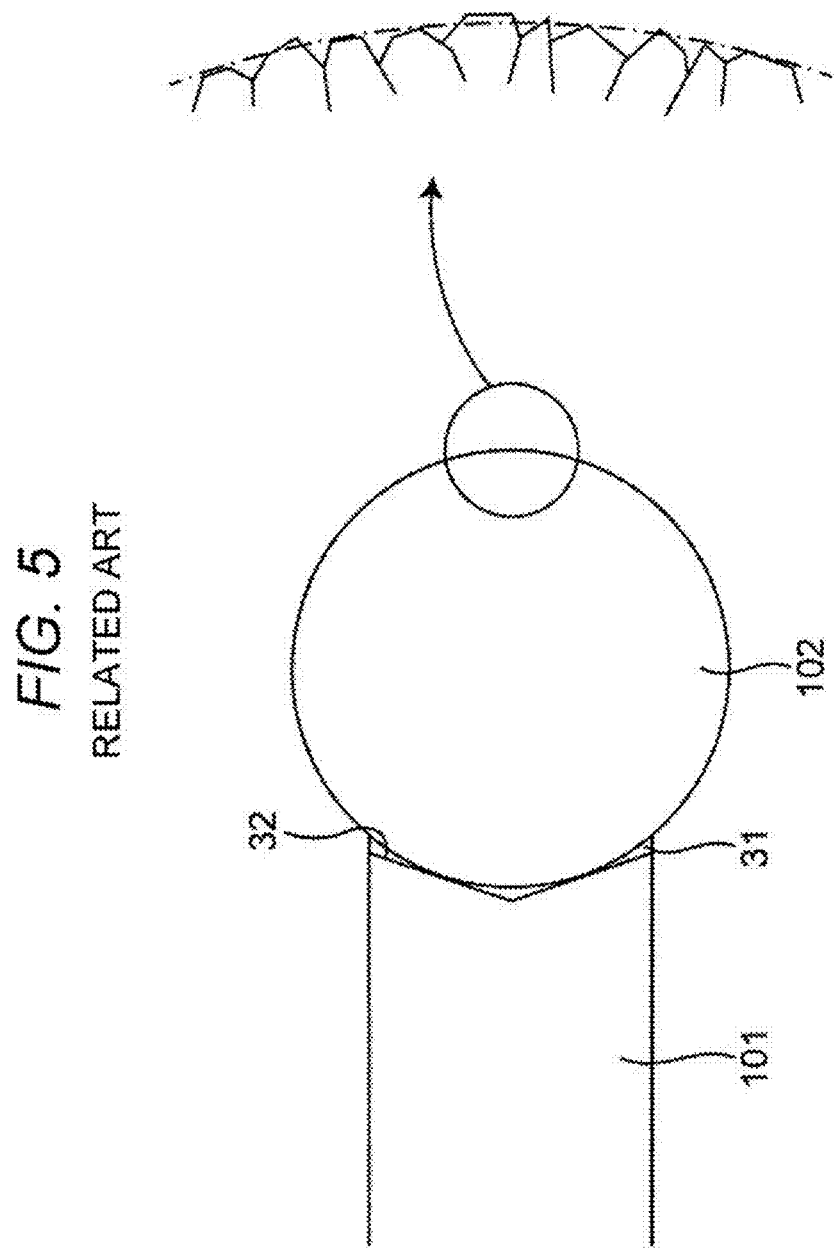
FIG. 5 is a view illustrating a shape of a stylus in the related art.

As above, the central axis (rotational axis 42) of shaft 1 is matched with the central axis of bulb 2 as illustrated in FIG. 4, and it is possible to manufacture stylus 40 including spiral-shaped groove 3 on shaft 1.

In the present embodiment, the processing is performed from the front end portion of bulb 2 toward the rear end portion of shaft 1; however, the processing may be performed from the rear end portion of shaft 1 toward the front end portion of bulb 2.

In the present embodiment, as the material of stylus 40, cemented carbide is used as an example; however, other materials such as diamond, sintered diamond, or ceramics may be used.

Stylus 40 which is manufactured in the present: embodiment has a purpose to measure an inner surface shape of a fine hole. Particularly, since it is not easy to perform exhausting of heat in the inside of the fine hole, frictional heat is propagated to stylus 40 during measurement, which hinders accurate measurement. In such a case, spiral-shaped groove 3 enables a surface area of shaft 1 to be increased, it is easy to perform exhausting of heat, and it is possible to perform measurement with higher accuracy. In addition, groove 3 is formed in the spiral shape, thereby having an effect of preventing the diameter of shaft 1 from being thin. Here, the fine hole indicates, as an example, a hole having a diameter of about Φ0.1 mm. p In the present embodiment, the processing of spiral-shaped groove 3 is performed on shaft 1 and the surface area of shaft 1 is increased. However, when the processing of the groove is performed to have concentric circles, the same effect is achieved with respect to fractional heat produced during measurement, but there is a possibility that strength of shaft 1 is decreased since the diameter of shaft 1 is thin, at the bottom of the groove.

According to the method of manufacturing stylus 40 and stylus 40 according to the embodiment, in a case where the inner surface shape of a fine hole is measured with accuracy, it is possible to measure the inner surface shape of the fine hole with accuracy without the stylus coming into contact with the inner surface of the fine hole, and it is possible to realize the manufacturing of stylus 40 having a longer service life.

In other words, in the case where the measurement of the inner surface shape of the fine hole is performed with the configuration of stylus 40 described above, a clearance between the inner wall of the fine hole and stylus 40 is secured because the central axes of shaft 1 and bulb 2: are substantially matched. Therefore, it is possible to measure the inner surface shape of the fine hole with stylus 40 without stylus 40 coming into contact with the inner surface shape of the fine hole.

According to the method of manufacturing stylus 40 described above, it is possible to manufacture stylus 40 in which the central axes of shaft 1 and bulb 2 are substantially matched. In addition, since there is no connection arc in connection portion 44 of shaft 1 with bulb 2, and it is possible to maximize the diameter of shaft 1, strength of stylus 40 is improved, and it is possible to increase the service life thereof.

In addition, in a stage of processing shaft 1, it is configured that rotary tool 5 relatively moves with respect to shaft 1 so as to form concentrically circular or spiral-shaped groove 3, thereby increasing the surface area of shaft 1, and making it possible to obtain stylus 40 which, is stable despite heat displacement of a measurement environment.

In addition, in terms of service life, it is desirable that, as the material of stylus 40, a material having high hardness such as cemented carbide, diamond, sintered diamond, or ceramics is used.

Appropriate combination of an arbitrary embodiment and an arbitrary modification example of the various embodiment or modification examples described above is performed, thereby mating it possible to achieve the effects of the respective embodiments and modification examples. In addition, it is possible to perform combination of the embodiments with each other, combination of the examples with each other, or combination of an embodiment with an example, and it is possible to perform combination of characteristics of different embodiments or examples.

A method of manufacturing the stylus and the stylus according to the present embodiment can be applied to a method of manufacturing a stylus that measures an inner surface shape of a hole with accuracy.

What is claimed is:

1. A stylus that includes a bulb on the front end of a shaft, which has a diameter greater than a diameter of the shaft, wherein the shaft and the bulb are formed of one member and the outer circumferential surface of the shaft has a corrugated section.

2. The stylus of claim 1, wherein the corrugated section is formed of a groove.

3. The stylus of claim 2, wherein the groove is spiral-shaped.

4. The stylus of claim 3, wherein a material of the stylus is cemented carbide.

5. The stylus of claim 3, wherein a material of the stylus is diamond or sintered diamond.

6. The stylus of claim 3, wherein a material of the stylus is ceramics.

7. A method of manufacturing a stylus comprising:
processing from a front end of a bulb to a connection portion with a shaft along an inclined surface of the bulb, using a rotary tool that is inclined at an angle formed by a connection point of a radius of the shaft with a radius of the bulb and the front end of the bulb; and
processing the shaft.

8. The method of manufacturing a stylus of claim 7, wherein, in the processing of the shaft, the rotary tool relatively moves with respect to the shaft so as to form a spiral-shaped groove on an outer circumferential surface of the shaft.

* * * * *